United States Patent [19]

Van Beek et al.

[11] Patent Number: 4,943,500
[45] Date of Patent: Jul. 24, 1990

[54] SEALED ELECTROCHEMICAL CELL

[75] Inventors: Johann R. G. C. M. Van Beek, Eindhoven; Gerrit Frens, Eersel, both of Netherlands

[73] Assignee: U.S. Philips Corporation, New York, N.Y.

[21] Appl. No.: 348,224

[22] Filed: May 5, 1989

[30] Foreign Application Priority Data

May 11, 1988 [NL] Netherlands ............... 8801233

[51] Int. Cl.$^5$ ............................................. H01M 10/34
[52] U.S. Cl. .................................... 429/207; 429/218; 429/57
[58] Field of Search ............... 429/218, 219, 223, 60, 429/57, 206, 207, 188; 252/182.1

[56] References Cited

U.S. PATENT DOCUMENTS

| 4,214,043 | 7/1980 | Van Deutekom | 429/60 X |
| 4,275,127 | 6/1981 | Ritterman et al. | 429/50 |
| 4,487,817 | 12/1984 | Willems et al. | 429/27 |
| 4,696,873 | 9/1987 | Yagasaki et al. | 429/59 |
| 4,699,856 | 10/1987 | Heuts et al. | 429/218 |
| 4,702,978 | 10/1987 | Heuts et al. | 429/218 |

*Primary Examiner*—Anthony Skapars
*Attorney, Agent, or Firm*—Norman N. Spain

[57] ABSTRACT

An electrochemical cell comprising a negative electrode whose electrochemically active material includes an intermetallic compound which can form a hydride with hydrogen, the cell comprising an electrolyte of a solution of at least one alkali hydroxide in water, the negative electrode being provided with a discharge buffer by introducing a quantity of an alkali metal, alkaline earth metal or aluminum into the cell before the cell is sealed, the quantity corresponding to the desired quantity of hydrogen in the negative electrode in the uncharged condition of the cell.

2 Claims, 1 Drawing Sheet

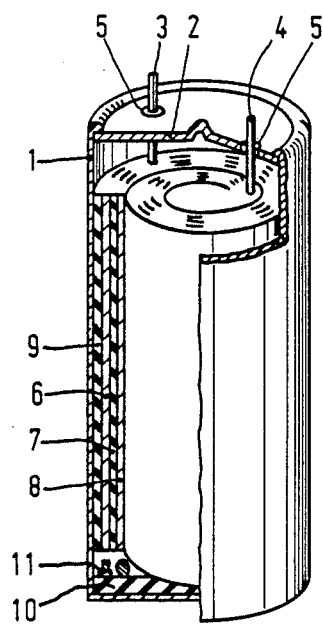

SEALED ELECTROCHEMICAL CELL

BACKGROUND OF THE INVENTION

The invention relates to a sealed electrochemical cell comprising a negative electrode whose electrochemically active material includes an intermetallic compound which can form a hydride with hydrogen, the cell comprising an electrolyte of a solution of at least one alkali hydroxide in water, and the negative electrode having a discharge buffer.

The invention also relates to a method of manufacturing such a sealed electrochemical cell.

A rechargeable cell of this type is described in European Patent Application No. EP 170519. In this cell the negative electrode has a larger electrochemical capacity than the positive electrode to preclude the formation of gaseous hydrogen in the case of overcharging. In the case of overdischarging, which may occur, for example, when such cells are connected in series in a battery, oxygen evolution and corrosion may cause damage to the negative electrode. To preclude this a part of the excess capacity of the negative electrode is filled with a precharge or discharge buffer. The purpose of these measures is to increase the operating life of the electrochemical cell, i.e., to increase the number of possible charging and discharging cycles. Moreover, overdischarging would lead to a substantial pressure increase in the cell. If this causes a safety valve to open, electrolyte escapes from the cell and, hence, the capacity of the cell decreases.

Because it is difficult to safely precharge cells on a large scale by supplying hydrogen gas to the cells before they are sealed, a precharging element is used in the above-mentioned European Patent Application. This precharging element comprises a base metal M, for example a transition metal or an element of one of the groups III and IV of the Periodic Table of Elements, and is electrically conductively connected to the negative electrode. This negative electrode is partly charged by oxidation of the precharging element according to the following reaction:

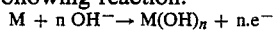

and by electron transfer to the negative electrode.

This known method has the disadvantage that foreign ions are present in the electrolyte. Moreover, to provide the cell with a precharging element which is connected to the negative electrode the construction of the cell must be adapted.

SUMMARY OF THE INVENTION

It is an object of the invention to provide an electrochemical cell of a simple construction, in which the negative electrode has a discharge buffer without an external supply of hydrogen gas. An additional object of the invention is to provide such a cell, in which the composition of the electrolyte is not disturbed by the presence of foreign, in particular, multivalent ions. A further object of the invention is to provide a method of manufacturing such an electrochemical cell, which method provides a desired quantity of a discharge buffer in a reproducible manner.

According to the invention, this object is achieved using an electrochemical cell as described in the opening paragraph, which cell is characterized in that the discharge buffer is obtained by the presence of an alkali metal, an alkaline earth metal or aluminium in contact with the electrolyte.

BRIEF DESCRIPTION OF THE DRAWINGS

The sole FIGURE in the drawing is a sectional view, partly in elevation, of a sealed rechargeable electrochemical cell of the invention.

The composition of the electrolyte is least influenced by using an alkali metal, in particular an alkali metal the ion of which is present in the electrolyte already in the form of the alkali hydroxide.

DETAILED DESCRIPTION OF THE INVENTION

Shortly before the cell is sealed, it is filled with electrolyte and the following reaction occurs between the alkali metal or alkaline earth metal M and water from the electrolyte:

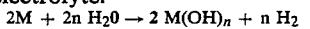

The hydrogen formed is absorbed in the negative electrode which thus obtains a discharge buffer. The construction of the cell does not have to be changed because electrical contact between the metal M and the negative electrode is not necessary. The alkali metal or alkaline earth metal is simply introduced into the cell in the form of a wire, metal shavings or metal grains before the cell is sealed.

In a very suitable embodiment of the cell according to the invention, the discharge buffer is provided by the presence of lithium in contact with the electrolyte. Using lithium has the advantage that there is no vigorous reaction when lithium is brought into contact with the electrolyte.

According to the invention, the object of providing a method of manufacturing an electrochemical cell is achieved in that the discharge buffer is provided by introducing a quantity of are alkali metal or alkaline earth metal into the cell before the cell is sealed, the quantity corresponding to the desired quantity of hydrogen in the negative electrode in the uncharged condition of the cell.

The invention will be explained in greater detail with reference to an embodiment and an accompanying drawing.

EXAMPLE

The cell which is shown in the FIGURE of the drawing and which is sealed from the air consists of a suitable housing 1 of metal, such as stainless steel, provided with a cover 2 having apertures for the conductors 3 and 4. By means of synthetic resin rings 5 the conductors are insulated from the metal housing (1,2). At the outside the housing may have a diameter of, for example, 22 mm and a height of 41 mm. A wound section which is composed of a negative electrode 6, a separator 7 and a positive electrode 8 is provided within the housing, the assembly being enveloped by an electrically insulating synthetic resin foil 9 of, for example, polyvinyl chloride and bearing on a disc 10 of an electrically insulating material such as polyvinyl chloride.

Shortly before the cell is filled with electrolyte and sealed, a quantity of lithium 11, for example, in the form of metal shavings or a small block is introduced into the cell, the hydrogen gas which is then form being absorbed by the negative electrode. When the reaction is completed some time after the cell has been sealed no metallic residues of lithium remain.

When the alkali metal is used in the form of a wire, it is advantageous to incorporate the wire in the wound section (6,7,8).

The negative electrode 6 comprises a hydrideforming intermetallic compound and is connected to the conductor 3. The hydride-forming compound has, for example, the composition $La_{0.8}Nd_{0.2}Ni_{2.5}Co_{2.4}Si_{0.1}$. Other suitable hydride-forming compounds are those described in, for example, U.S. Pat. Specifications No. US 4487817, US 4699856 and US 4702978, and also, for example, TiNi alloys. The negative electrode is produced by fusing appropriate quantities of the relevant elements, pulverizing the intermetallic compound thus formed and applying it to a nickel substrate, for example with the aid of a paste comprising a polymer binder material such as polyvinyl alcohol. The paste is, for example, composed of 75% by weight of the intermetallic compound, 24.5% by weight of water and 0.5% by weight of polyvinyl alcohol.

The positive electrode 8 is a nickel hydroxide electrode of the conventional sintered type, and is connected to the conductor 4. A 6 N lithium hydroxide and potassium hydroxide solution (molar ratio 1:1) in water is used as the electrolyte. The electrolyte is absorbed in the separator 7 and so contacts the electrochemically active material of the two electrodes that it is wetted thereby. The separator is in the form of a non-woven sheet of polyamide fibres.

The free gas space in the cell is approximately 5 cm$_3$. A sealed cell of this type has an EMF of between 1.2 and 1.4V. The cells according to the invention can be assembled in a conventional manner to form batteries comprising, for example, a plurality of series-arranged cells.

A cell which is sealed from the atmosphere may comprise a valve of such a dimension that it becomes operative at a predetermined pressure.

In a rechargeable cell of the sealed type the electrochemically active portion of the positive electrode is composed of, for example, nickel hydroxide, silver oxide or manganese oxide, nickel hydroxide generally being preferred for practical reasons.

The electrolyte used in the cell generally consists of a solution in water of one or more alkali hydroxides, such as lithium hydroxide, sodium hydroxide and potassium hydroxide, having a pH exceeding 7.

In addition, the cell may comprise a separator which electrically insulates the electrodes, but permits ion and gas transport. The separator may consist of (woven or unwoven) synthetic resin fibres, for example polyamide fibres or polypropylene fibres, and is preferably hydrophilic.

We claim:

1. A sealed electrochemical cell comprising a negative electrode whose electrochemically active material includes an intermetallic compound which can form a hydride with hydrogen, the cell comprising an electrolyte of a solution of at least one alkali hydroxide in water, and the negative electrode having a discharge buffer, characterized in that the discharge buffer is formed by one of an alkali metal, an alkaline earth metal or aluminum in contact with the electrolyte.

2. A sealed electrochemical cell as claimed in claim 1, characterized in that the discharge buffer is formed by lithium in contact with the electrolyte.

* * * * *